United States Patent
Nakazawa et al.

(10) Patent No.: US 7,938,360 B2
(45) Date of Patent: May 10, 2011

(54) MAIN WING STRUCTURE OF AIRCRAFT

(75) Inventors: Jun Nakazawa, Saitama (JP); Kazuhide Hasegawa, Saitama (JP); Hirohide Azuma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 748 days.

(21) Appl. No.: 11/978,717

(22) Filed: Oct. 30, 2007

(65) Prior Publication Data

US 2008/0149761 A1    Jun. 26, 2008

(30) Foreign Application Priority Data

Nov. 8, 2006   (JP) ................... 2006-302637

(51) Int. Cl.
*B64B 1/24* (2006.01)
*B64C 3/28* (2006.01)

(52) U.S. Cl. .................... 244/54; 244/123.4

(58) Field of Classification Search .......... 244/54, 244/123.1, 135 R, 134 D, 134 B, 102 R, 244/53 R, 123.4

See application file for complete search history.

(56) References Cited

U.S. PATENT DOCUMENTS

| | | | | |
|---|---|---|---|---|
| 1,850,012 A | * | 3/1932 | Hicks | |
| 2,372,143 A | * | 3/1945 | Watter | 244/123.1 |
| 2,397,184 A | * | 3/1946 | Klose | |
| 2,514,105 A | * | 7/1950 | Thomas | |
| 2,613,893 A | * | 10/1952 | Young | |
| 2,995,320 A | * | 8/1961 | Gottschalk | |
| 3,067,968 A | * | 11/1962 | Heppenstall | |
| 3,579,215 A | * | 5/1971 | Brasket | |
| 3,638,421 A | * | 2/1972 | Chilman | |
| 3,727,862 A | * | 4/1973 | Kaufhold et al. | |
| 4,481,703 A | * | 11/1984 | Scott | |
| 4,624,425 A | * | 11/1986 | Austin et al. | |
| 5,000,400 A | * | 3/1991 | Stuhr | |
| 5,484,121 A | * | 1/1996 | Padawer et al. | |
| 6,196,500 B1 | * | 3/2001 | Al-Khalil et al. | 244/134 R |
| 6,923,403 B1 | | 8/2005 | Dizdarevic et al. | |

FOREIGN PATENT DOCUMENTS

| | | |
|---|---|---|
| EP | 0 268 837 A2 | 6/1988 |
| EP | 0 941 922 A1 | 9/1999 |
| GB | 546794 A | 7/1942 |
| JP | 63-135479 A | 6/1988 |

* cited by examiner

*Primary Examiner* — Tien Dinh
(74) *Attorney, Agent, or Firm* — Birch, Stewart, Kolasch & Birch, LLP

(57) ABSTRACT

Plural regions are defined within a main wing by a plurality of spars and ribs. Of these regions, predetermined regions extending from a main wing connecting portion of the pylon to an internal space of a leading edge skin are used as wiring/piping accommodating chambers for collectively accommodating wiring and piping which provide communication between an engine and a fuselage, a predetermined region adjacent to parts of the wiring/piping accommodating chambers is used as a landing device accommodating chamber for accommodating a landing device and predetermined regions adjacent to other parts of the wiring/piping accommodating chambers are used as fuel tanks. Thus, the maintainability is improved as compared with the case where the wiring and the piping are distributed within the main wing. In addition, because the wiring/piping accommodating chambers are isolated from the landing device accommodating chamber and the fuel tanks, the operational reliability can be improved.

20 Claims, 4 Drawing Sheets

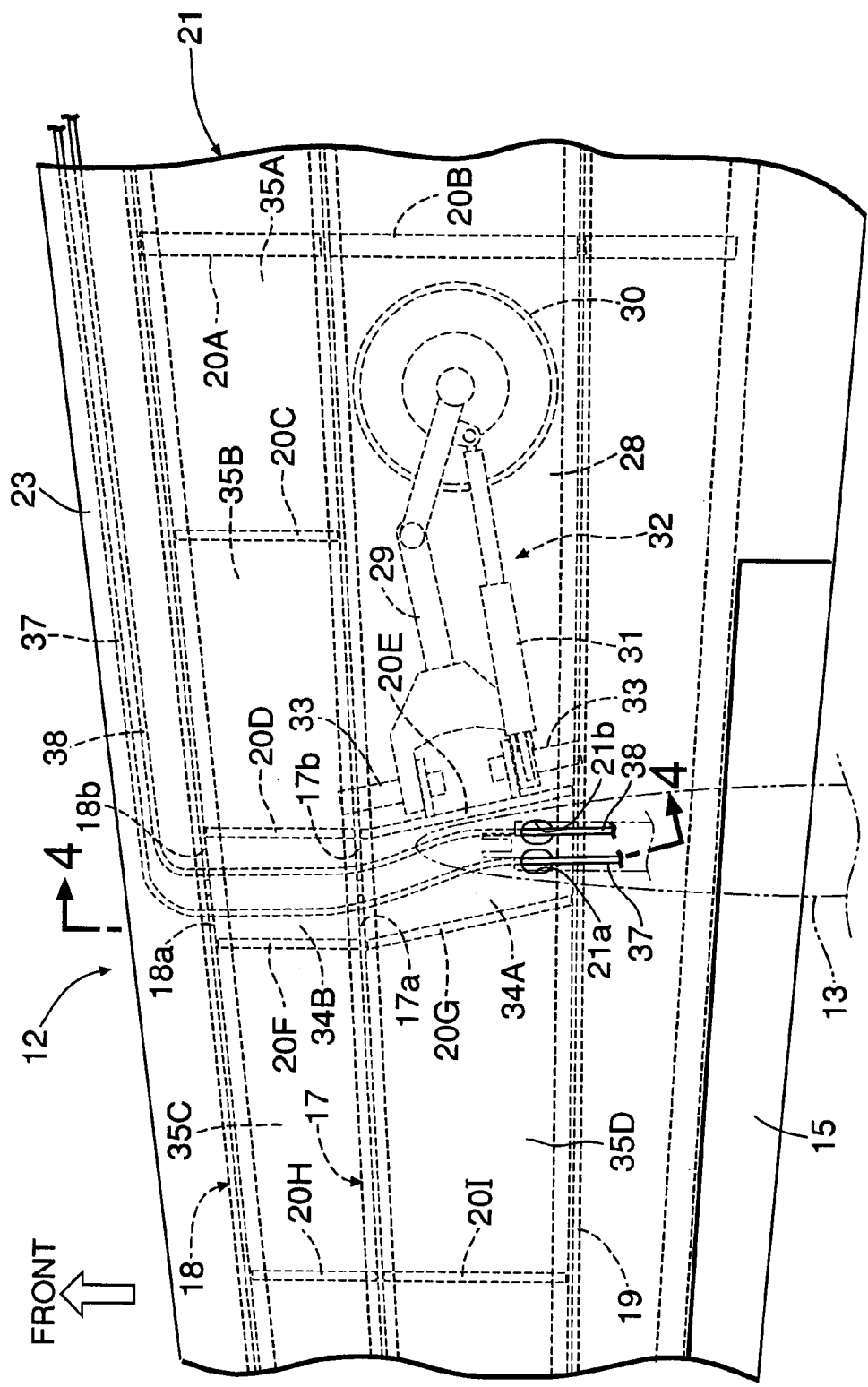

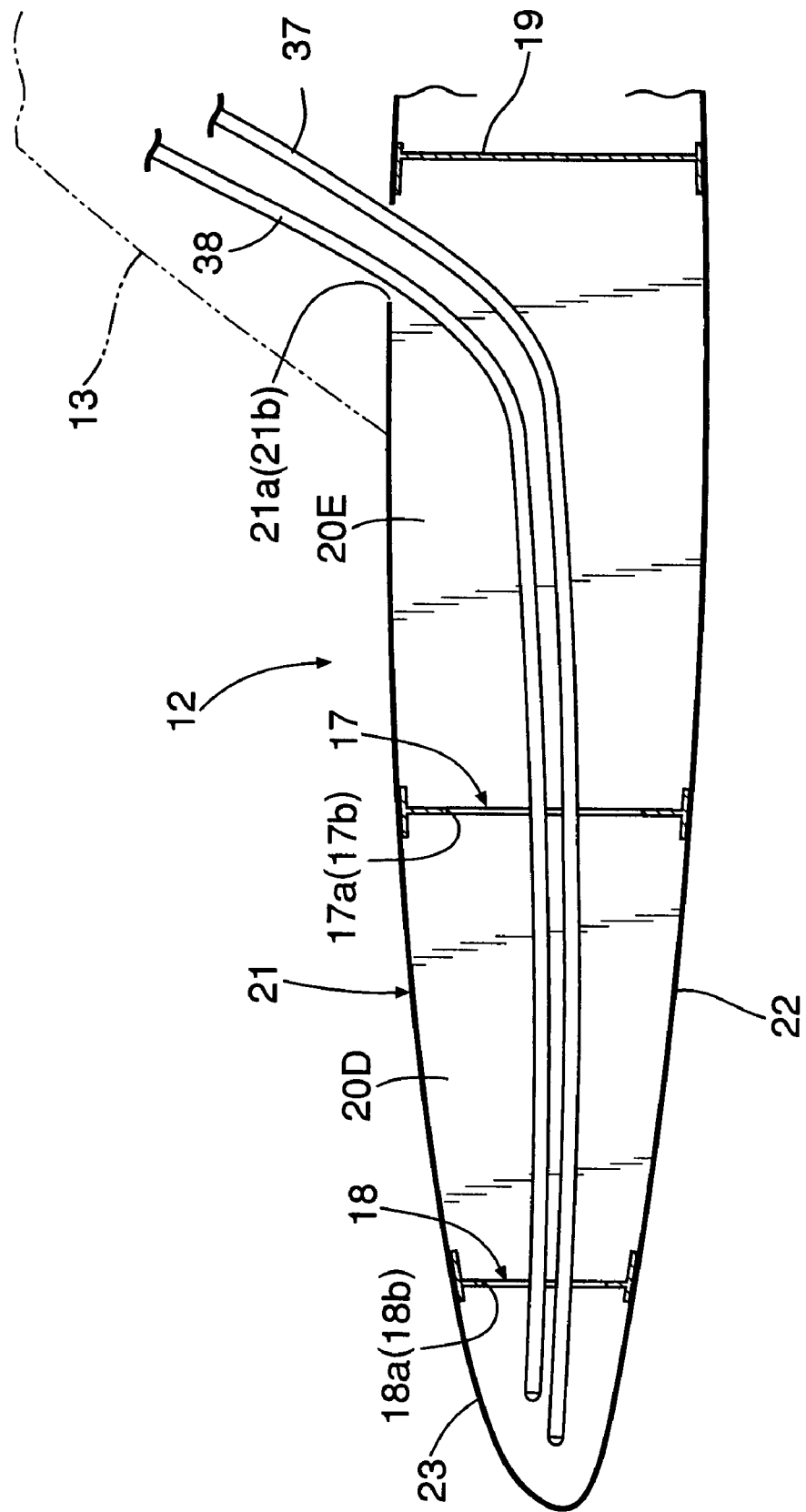

MAIN WING STRUCTURE OF AIRCRAFT

CROSS-REFERENCE TO RELATED APPLICATIONS

The present application claims priority under 35 USC 119 to Japanese Patent Application No. 2006-302637 filed on Nov. 8, 2006 the entire contents of which are hereby incorporated by reference.

BACKGROUND OF THE INVENTION

1. Field of the Invention

The present invention relates to a main wing structure of an aircraft in which an engine is supported on an upper or lower surface of a main wing via a pylon.

2. Description of Background Art

An aircraft is known wherein pylons rise from the upper surfaces of right and left main wings and engines are supported at the upper ends of the pylons. See, for example, the AIAA 2003-2530 "Design and Development of the Honda Jet" article by Michimasa Fujino, Honda R&D Americas, Inc., July, 2003.

In an aircraft, the engine and a fuselage of the aircraft are connected to each other by wiring for feeding electric power from a generator driven by the engine into the fuselage. Wiring is provided for transmitting engine control signals to the engine. In addition, piping is provided for pressurizing a cabin and supplying air for heating the cabin, and the like. The wirings and pipings are arranged within the main wing.

In the aircraft described in the above article, a landing device accommodating chamber is provided between the pylon of main wing and the fuselage. The wiring and piping extend forward from the interior of the landing device accommodating chamber to the interior of a leading edge skin, and then pass through the interior of the leading edge skin into the fuselage.

In the above-described conventional main wing structure, because the wiring and piping providing a connection between the engine and the fuselage pass through the landing device accommodating chamber, a particular consideration is required to be paid to prevent interference between the wiring and the piping when the landing device is operated. In addition, because the wiring and piping pass through the interior of the main wing between the landing device accommodating chamber and the leading edge skin, there is a problem wherein a fuel tank cannot be provided in such an area.

SUMMARY OF THE INVENTION

The present invention has been achieved in view of the above-described circumstances. It is an object of an embodiment of the present invention to improve the operational reliability and to effectively utilize a space within a main wing by rationally arranging wiring and piping which provides a connection between an engine provided on the main wing and a fuselage.

In order to achieve the above object, according to an embodiment of the present invention, there is provided a main wing structure of an aircraft comprising a fuselage, a main wing, a pylon, and an engine supported on an upper or lower surface of the main wing via the pylon. A plurality of regions are defined within the main wing by a plurality of spars extending in a span direction and a plurality of ribs extending in a chord direction; wherein a predetermined region extending from a main wing connecting portion of the pylon to an internal space of a leading edge skin 23 is used as a wiring/piping accommodating chamber for collectively accommodating wiring and piping which provide communication between the engine and the fuselage. A predetermined region adjacent to a part of the wiring/piping accommodating chamber is used as a landing device accommodating chamber for accommodating a landing device. In addition, a predetermined region adjacent to another part of the wiring/piping accommodating chamber is used as a fuel tank.

With the arrangement of the an embodiment of the present invention, of the plurality of regions defined within the main wing by the plurality of spars and the plurality of ribs, the predetermined region extending from the main wing connecting portion of the pylon to an internal space of the leading edge skin is used as the wiring/piping accommodating chamber for collectively accommodating the wiring and the piping which provide communication between the engine and the fuselage. The predetermined region adjacent to a part of the wiring/piping accommodating chamber is used as the landing device accommodating chamber for accommodating the landing device. The predetermined region adjacent to another part of the wiring/piping accommodating chamber is used as a fuel tank. Thus, the maintainability is improved as compared with the case wherein the wiring and the piping are distributed within the main wing. In addition, because the wiring/piping accommodating chamber is isolated from the landing device accommodating chamber and the fuel tank, the operational reliability can be improved. Moreover, the dead space in the main wing is minimized to increase the capacity of fuel tank.

According to an embodiment of the present invention, in addition to the first feature, a first wiring/piping guide hole allowing the wiring and the piping to pass therethrough is formed in an upper skin or a lower skin of the main wing corresponding to the main wing connecting portion of the pylon arranged on the upper or lower surface of the main wing. In addition, a second wiring/piping guide hole allowing the wiring and the piping to pass therethrough is formed in the spar that partitions or crosses the wiring/piping accommodating chamber.

With the arrangement of this embodiment of the present invention, the first wiring/piping guide hole is formed in the upper skin or the lower skin of the main wing corresponding to the main wing connecting portion of the pylon arranged on the upper surface or the lower surface of the main wing, and the second wiring/piping guide hole is formed in the spar that partitions or crosses the wiring/piping accommodating chambers. Therefore, it is possible to smoothly handle the wiring and the piping which provide a connection between the engine and the fuselage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a view taken in the direction of arrow 3 in FIG. 2; and

FIG. 4 is a sectional view taken along line 4-4 in FIG. 2.

DESCRIPTION OF THE PREFERRED EMBODIMENT

Figure 1:
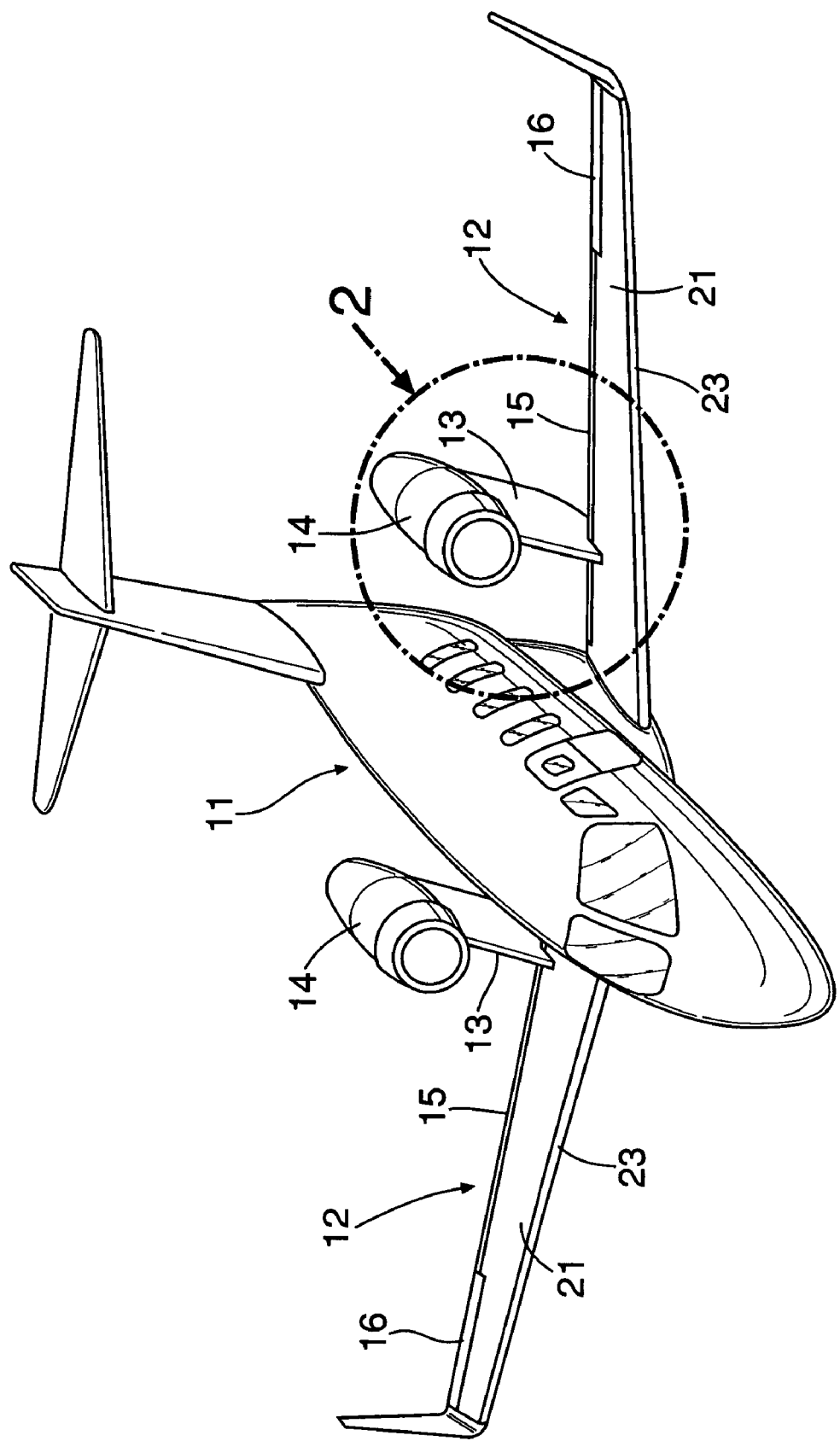
FIG. 1 is a perspective view of an entire aircraft.
Figure 2:
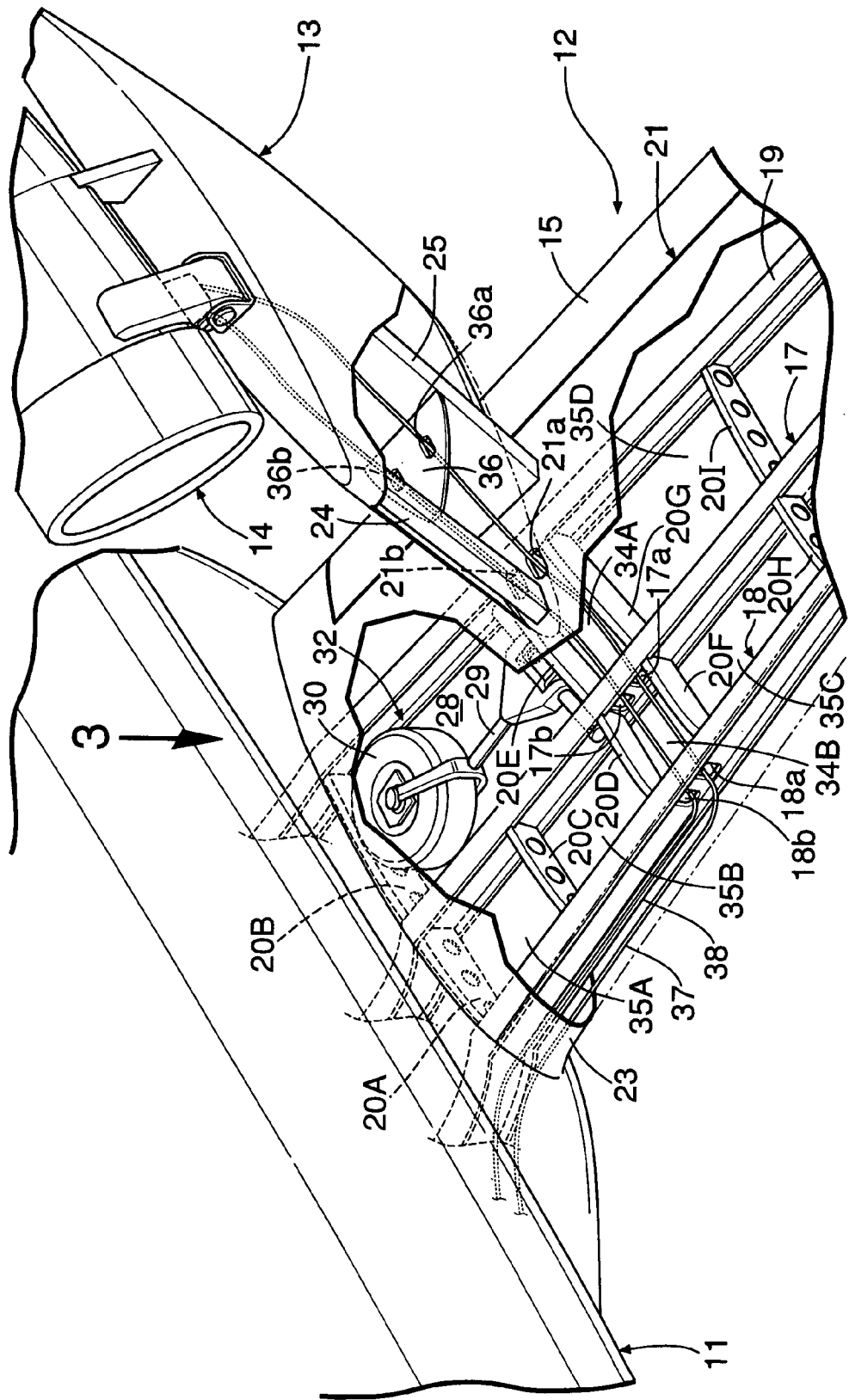
FIG. 2 is an enlarged view taken in the direction of arrow 2 in FIG. 1.

As shown in FIG. 1, a low-wing aircraft has right and left main wings 12 supported in the lower parts of a fuselage 11. Engines 14 are supported on the upper surfaces of the right and left main wings 12 via pylons 13. Flaps 15 are oscillatably supported on trailing edge parts of the right and left main wings 12 on inner sides in the span direction. Ailerons 16 are oscillatably supported on the trailing edge parts of the right and left main wings 12 on outer sides in the span direction, As shown in FIGS. 2 to 4, the main wing 12 includes a main spar 17 extending substantially in the span direction, a front spar 18 arranged in front of the main spar 17, and a rear spar 19 arranged in the rear of the main spar 17. The main spar 17, the front spar 18, and the rear spar 19 are connected to each other by a large number of ribs 20A to 20I, each extending in the chord direction. The upper and lower surfaces of the main spar 17, the front spar 18, the rear spar 19, and the ribs 20A to 20I are covered with an upper skin 21 and a lower skin 22, respectively. A leading edge skin 23 is connected to the front part of the front spar 18.

The pylon 13 comprises a front stay 24 and a rear stay 25 which form the skeletal structure of the pylon 13. The lower end of the front stay 24 and the lower end of the rear stay 25 are fixed to fixing parts (not shown) provided on the main wing 12. The front stay 24 and the rear stay 25 are connected to each other by a pylon rib 36. Wiring/piping guide holes 36a and 36b are formed in the pylon rib 36 so as to allow a wiring 37 and a piping 38 (described later) to pass therethrough, respectively.

A landing device accommodating chamber 28 is defined by the main spar 17, the rear spar 19, the rib 20B, and the rib 20E, and accommodates a landing device 32 including a leg 29, a tire 30, and a shock absorber 31. A pair of pivots 33 are provided at the base end of the leg 29, and supported by the main spar 17 and the rear spar 19 so that the landing device 32 can be oscillated between a lowered position at which the landing device 32 projects from the lower surface of the main wing 12 and a raised position at which landing device 32 is accommodated in the landing device accommodating chamber 28 through a hydraulic mechanism (not shown).

Regions in front of a part in which the pylon 13 are mounted to the upper skin 21 and are surrounded by the front spar 18, the rear spar 19, the rib 20D, the rib 20E, the rib 20F, and the rib 20G to define passage-shaped rear and front wiring/piping accommodating chambers 34A and 34B. Two first wiring/piping guide holes 21a and 21b are formed in the upper skin 21 corresponding to the mounting part of the pylon 13. Two second wiring/piping guide holes 17a and 17b are formed in the main spar 17 that partition the rear and front wiring/piping accommodating chambers 34A and 34B from each another. Two second wiring/piping guide holes 18a and 18b are formed in the front spar 18 that partitions the front-side wiring/piping accommodating chamber 34B from the interior of the leading edge skin 23.

Regions in front of and laterally outward of the landing device accommodating chamber 28 and laterally inward of the wiring/piping accommodating chamber 34B are surrounded by the upper skin 21, the lower skin 22, the main spar 17, the front spar 18, the rib 20A, the rib 20C, and the rib 20D to define two fuel tanks (integral tanks) 35A and 35B. Regions laterally outward of the front and rear wiring/piping accommodating chambers 34A and 34B are surrounded by the upper skin 21, the lower skin 22, the main spar 17, the front spar 18, the rear spar 19, the rib 20F, the rib 20G, the rib 20H, and the rib 20I to define two fuel tanks (integral tanks) 35C and 35D.

Other fuel tanks (not shown) are defined laterally outward of the fuel tanks 35C and 35D.

Wiring for feeding electric power from a generator (not shown) driven by the engine 14 to the fuselage 11 and wiring for transmitting engine control signals between the engine 14 and a cockpit are bundled into a single wiring 37. The wiring 37 extends from the engine 14 to pass through the interior of the pylon 13, the wiring/piping guide hole 36a in the pylon rib 36, and the first wiring/piping guide hole 21a in the upper skin 21 of the main wing 12, and enters the rear wiring/piping accommodating chamber 34A. Further, the wiring 37 passes through the second wiring/piping guide hole 17a in the main spar 17, the front wiring/piping accommodating chamber 34B, the second wiring/piping guide hole 18a in the front spar 18, and the interior of the leading edge skin 23, and enters the fuselage 11.

In the same way, the piping 38 for feeding air from the engine 14 in order to pressurize and heat the cabin in the fuselage 11, extends from the engine 14 to pass through the interior of the pylon 13, the wiring/piping guide hole 36b in the pylon rib 36, and the first wiring/piping guide hole 21b in the upper skin 21 of the main wing 12, and enters the rear wiring/piping accommodating chamber 34A. Further, the piping 38 passes through the second wiring/piping guide hole 17b in the main spar 17, the front wiring/piping accommodating chamber 34B, the second wiring/piping guide hole 18b in the front spar 18, and the interior of the leading edge skin 23, and enters the fuselage 11.

As described above, in this embodiment, of the plurality of regions defined within the main wing 12 by the main spar 17, the front spar 18, the rear spar 19 extending in the span direction, and the plurality of ribs 20A to 20I, the predetermined regions extending from the main wing connecting portion of the pylon 13 to the internal space of the leading edge skin 23 are used as the wiring/piping accommodating chamber 34A and 34B for collectively accommodating the wiring 37 and the piping 38 which provide communication between the engine 14 and the fuselage 11. The predetermined region adjacent to parts of the wiring/piping accommodating chamber 34A and 34B is used as the landing device accommodating chamber 28 for accommodating the landing device 32. In addition; the predetermined regions adjacent to other parts of the wiring/piping accommodating chamber 34A and 34B is used as the fuel tanks 35A to 35D.

With this arrangement, the maintainability is improved as compared with the case where the wiring 37 and the piping 38 are distributed within the main wing 12. In addition, the wiring/piping accommodating chambers 34A and 34B are isolated from the landing device accommodating chamber 28 and the fuel tanks 35A to 35D, thereby eliminating a possibility that the wiring 37 and the piping 38 interfere with the landing device 32, which is raised and lowered, to improve the operational reliability of the wiring 37 and the piping 38. Moreover, because the wiring/piping accommodating chambers 34A and 34B collectively accommodate the wiring 37 and the piping 38, it is possible to utilize the space in front of the landing device accommodating chamber 28, which has been a dead space in a conventional main wing, as a space for providing the fuel tanks 35A and 35B, thereby increasing an amount of loadable fuel to extend the cruising distance.

Also, because the first wiring/piping guide holes 21a and 21b are formed in the upper skin 21 of the main wing 12 corresponding to the part in which the pylon 13 is mounted to the main wing 12, the second wiring/piping guide holes 17a and 17b are formed in the main spar 17 partitioning the front and rear wiring/piping accommodating chambers 34A and 34B from each other, and the second wiring/piping guide holes 18a and 18b are formed in the front spar 18 partitioning the front-side wiring/piping accommodating chamber 34B from the interior of the leading edge skin 23, it is possible to smoothly handle the wiring 37 and the piping 38 which provide connections between the engine 14 and the fuselage 11.

The embodiment of the present invention has been described above, but various changes in design may be made without departing from the subject matter of the present invention. For example, in this embodiment, the engines 14 are supported on the upper surfaces of the main wings 12 via the pylons 13, however, the engines 14 may be supported on the lower surfaces of the main wings 12 via the pylons 13.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A main wing structure of an aircraft comprising:
a fuselage;
a main wing;
a pylon; and
an engine supported on an upper or lower surface of the main wing via the pylon;
a plurality of regions are defined within the main wing by a plurality of spars extending in a span direction and a plurality of ribs extending in a chord direction, wherein a predetermined region extending from a main wing connecting portion of the pylon to an internal space of a leading edge skin is used as a wiring/piping accommodating chamber having a wiring and a piping which provide communication between the engine and the fuselage;
wherein a predetermined region adjacent to a part of the wiring/piping accommodating chamber is used as a landing device accommodating chamber for housing a landing device; and
wherein a predetermined region adjacent to another part of the wiring/piping accommodating chamber is a fuel tank,
wherein the landing device accommodating chamber and the part of the wiring/piping accommodating chamber are disposed between two spars which are adjacent to each other.

2. The main wing structure of an aircraft according to claim 1, wherein a first wiring/piping guide hole allowing the wiring and the piping to pass therethrough is formed in an upper skin or a lower skin of the main wing corresponding to the main wing connecting portion of the pylon arranged on the upper or lower surface of the main wing; and
a second wiring/piping guide hole allowing the wiring and the piping to pass therethrough is formed in the spar that partitions or crosses the wiring/piping accommodating chamber.

3. The main wing structure of an aircraft according to claim 1, wherein the engine is supported on an upper surface of the main wing with one end of the pylon being secured thereto, the pylon being secured to the main wing in a position in the span direction between the landing device accommodating chamber and said predetermined region adjacent to the another part of the wiring/piping accommodating chamber.

4. The main wing structure of an aircraft according to claim 3, wherein the pylon includes a front stay and a rear stay forming a skeletal structure with a lower end of the front stay and the rear stay being secured to the main wing.

5. The main wing structure of an aircraft according to claim 4, wherein the front stay and the rear stay are connected to each other by a pylon rib.

6. The main wing structure of an aircraft according to claim 5, wherein the pylon rib is displaced a predetermined distance relative to the main wing in a direction towards the engine.

7. The main wing structure of an aircraft according to claim 1, wherein the wiring and the piping which provide communication between the engine and the fuselage pass through still another part of the wiring/piping accommodation chamber which is located in the span direction between the landing device accommodating chamber and said predetermined region adjacent to the another part of the wiring/piping accommodating chamber.

8. The main wing structure of an aircraft according to claim 1, wherein the predetermined region for collectively accommodating the wiring/piping is formed by a front spar, a rear spar and ribs formed on a first side adjacent to the fuselage and on a second side displaced a predetermined distance relative to the first side.

9. The main wing structure of an aircraft according to claim 8, wherein two first wiring/piping guide holes are formed in an upper skin corresponding to a mounting portion of the pylon and two second wiring/piping guide holes are formed in a main spar that partitions rear and front wiring/piping accommodating chambers and two wiring/piping guide holes are formed in the front spar that partitions the front side wiring/piping accommodating chamber from an interior of the leading edge skin.

10. The main wing structure of an aircraft according to claim 1, wherein the piping is adapted to extend from the engine to a cabin within the fuselage for providing pressurization and heat to the cabin.

11. A main wing structure of an aircraft comprising:
a fuselage;
a main wing;
a pylon; and
an engine connected to said pylon and supported on the main wing;
a first region defined within the main wing by a plurality of spars extending in a span direction and a plurality of ribs extending in a chord direction, wherein the first region extending from a main wing connecting portion of the pylon to an internal space of a leading edge skin is used as a wiring/piping accommodating chamber having a wiring and a piping for providing communication between the engine and the fuselage;
a second region formed adjacent to a part of the wiring/piping accommodating chamber is used as a landing device accommodating chamber housing a landing device; and
a third region formed adjacent to another part of the wiring/piping accommodating chamber is a fuel tank,
wherein the first region is located in the span direction between the second and third region.

12. The main wing structure of an aircraft according to claim 11, wherein a first wiring/piping guide hole for accommodating the wiring and the piping to pass therethrough is formed in a skin of the main wing corresponding to the main wing connecting portion of the pylon arranged on the upper or lower surface of the main wing; and a second wiring/piping guide hole for accommodating the wiring and the piping to pass therethrough is formed in the spar that partitions or crosses the wiring/piping accommodating chamber.

13. The main wing structure of an aircraft according to claim 11, wherein the engine is supported on an upper surface of the main wing with one end of the pylon being secured thereto, the pylon being secured to the main wing in a position in the span direction between the second and third regions.

14. The main wing structure of an aircraft according to claim 13, wherein the pylon includes a front stay and a rear stay forming a skeletal structure with a lower end of the front stay and the rear stay being secured to the main wing.

15. The main wing structure of an aircraft according to claim 14, wherein the front stay and the rear stay are connected to each other by a pylon rib.

16. The main wing structure of an aircraft according to claim 15, wherein the pylon rib is displaced a predetermined distance relative to the main wing in a direction towards the engine.

17. The main wing structure of an aircraft according to claim 11, wherein the second region and the third region are arranged between two spars which are adjacent to each other.

18. The main wing structure of an aircraft according to claim 11, wherein the first region for collectively accommodating the wiring/piping is formed by a front spar, a rear spar and ribs formed on a first side adjacent to the fuselage and on a second side displaced a predetermined distance relative to the first side.

19. The main wing structure of an aircraft according to claim 18, wherein two first wiring/piping guide holes are formed in an upper skin corresponding to a mounting portion of the pylon and two second wiring/piping guide holes are formed in a main spar that partitions rear and front wiring/piping accommodating chambers and two wiring/piping guide holes are formed in the front spar that partitions the front side wiring/piping accommodating chamber from an interior of the leading edge skin.

20. The main wing structure of an aircraft according to claim 11, wherein the piping is adapted to extend from the engine to a cabin within the fuselage for providing pressurization and heat to the cabin.

* * * * *